United States Patent
Gleason, II

[11] Patent Number: 6,161,451
[45] Date of Patent: Dec. 19, 2000

[54] LINK ASSEMBLY

[75] Inventor: Kenneth J. Gleason, II, Lake Geneva, Wis.

[73] Assignee: MacLean-Fogg Company, Mundelein, Ill.

[21] Appl. No.: 09/232,990

[22] Filed: Jan. 18, 1999

[51] Int. Cl.[7] .............................. G05G 1/00; F16C 11/06
[52] U.S. Cl. ..................... 74/579 R; 74/473.3; 74/469; 403/122; 403/143
[58] Field of Search .................................. 74/473.3, 469, 74/579 R; 403/122, 141, 143

[56] References Cited

U.S. PATENT DOCUMENTS

| 1,559,402 | 10/1925 | Boardman | 403/76 |
| 1,936,556 | 11/1933 | Lautz | 74/579 R |
| 4,225,261 | 9/1980 | Marx | 403/122 |
| 5,277,860 | 1/1994 | Sinclair | 264/242 |
| 5,352,059 | 10/1994 | Ueno et al. | 403/122 |
| 5,613,792 | 3/1997 | Terada et al. | 403/131 |
| 5,615,967 | 4/1997 | Hellon | 403/133 |
| 5,833,383 | 11/1998 | Bauman | 403/122 |

FOREIGN PATENT DOCUMENTS 10-151931  6/1998  Japan .

*Primary Examiner*—Allan D. Herrmann
*Attorney, Agent, or Firm*—Richard G. Lione; Brinks Hofer Gilson & Lione

[57] ABSTRACT

A link assembly for a vehicle control system comprising a spacer molded of glass-filled nylon and a socket housing mounted on each end of the spacer, both socket housings also being molded of glass-filled nylon. Each housing comprises a male socket component and a female socket component which are mirror-image, identical to each other except for complementary male locator protrusions and female locator depressions formed in opposing relationship on mating faces of respective components. The components are ultrasonically welded together to capture opposite ends of the spacer and the ball ends of respective ball studs.

6 Claims, 4 Drawing Sheets

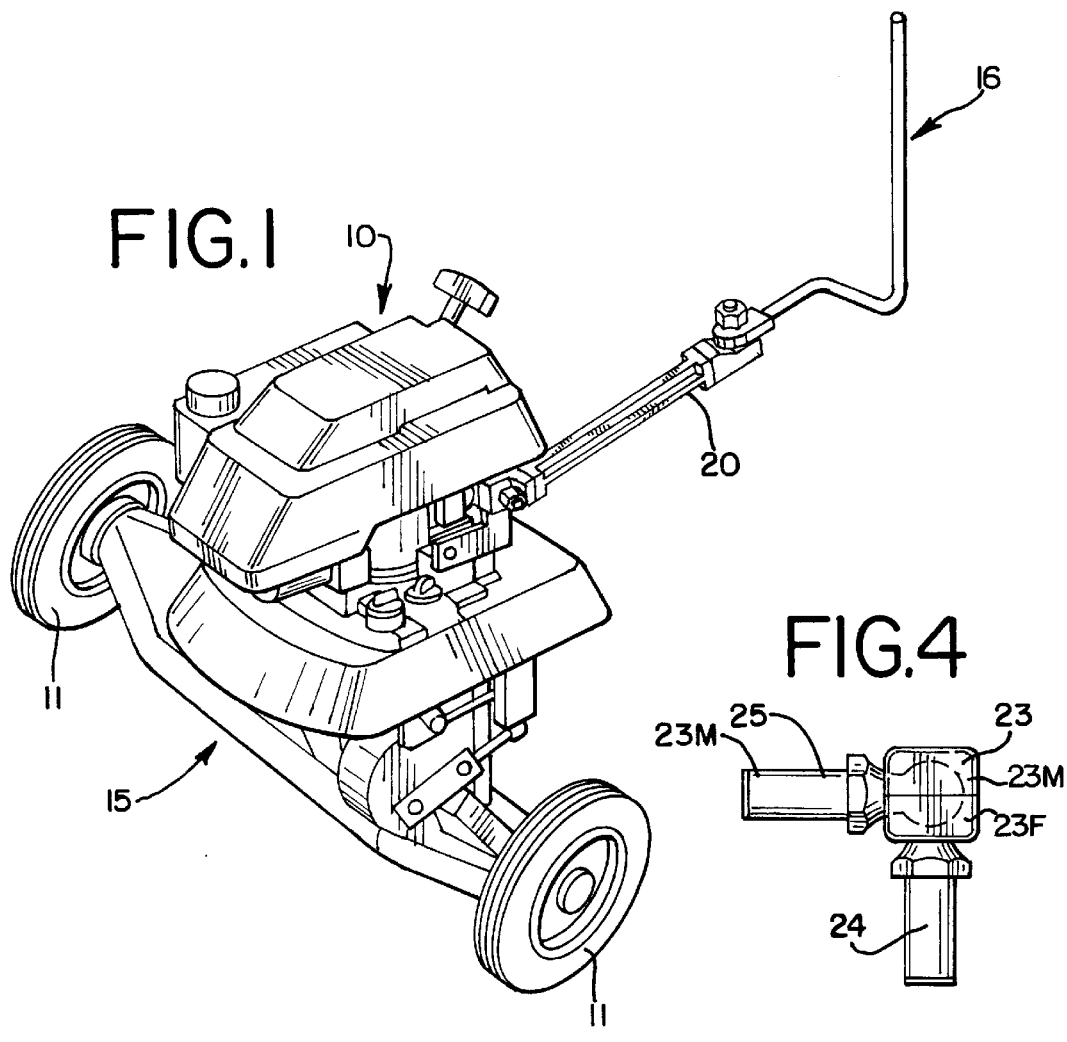
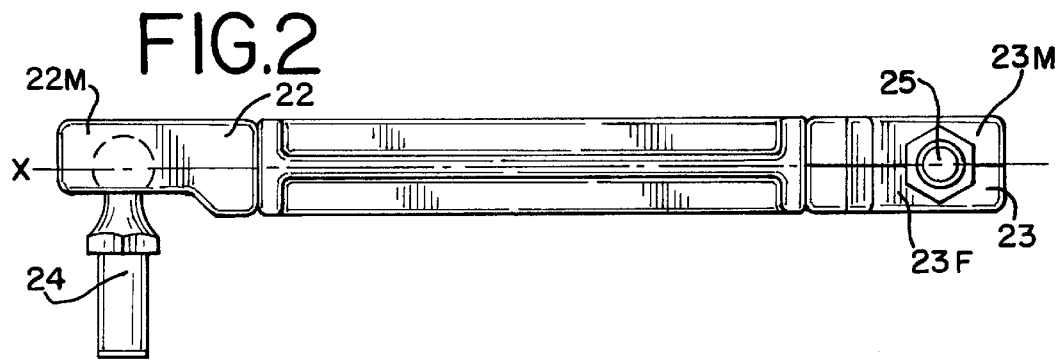
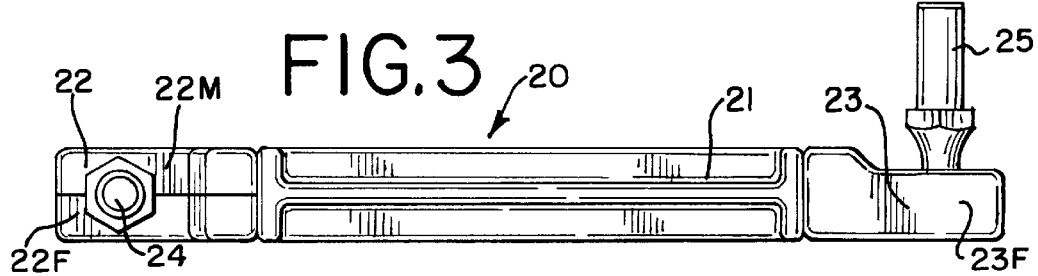

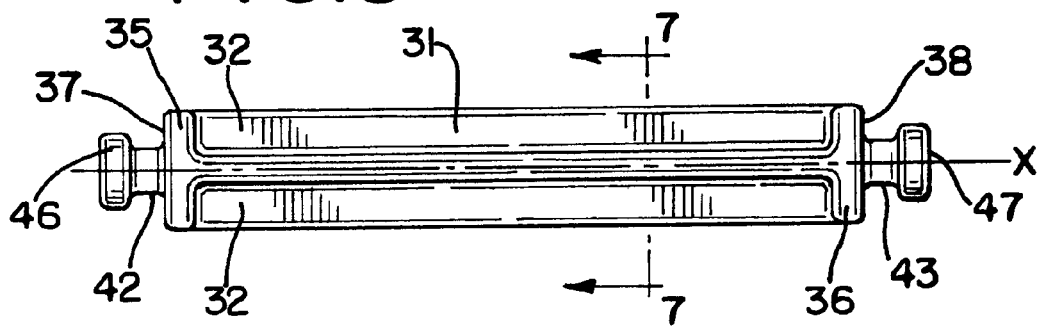
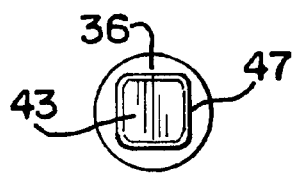
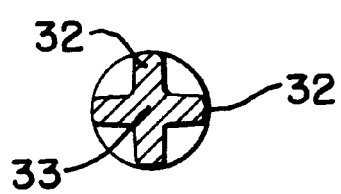
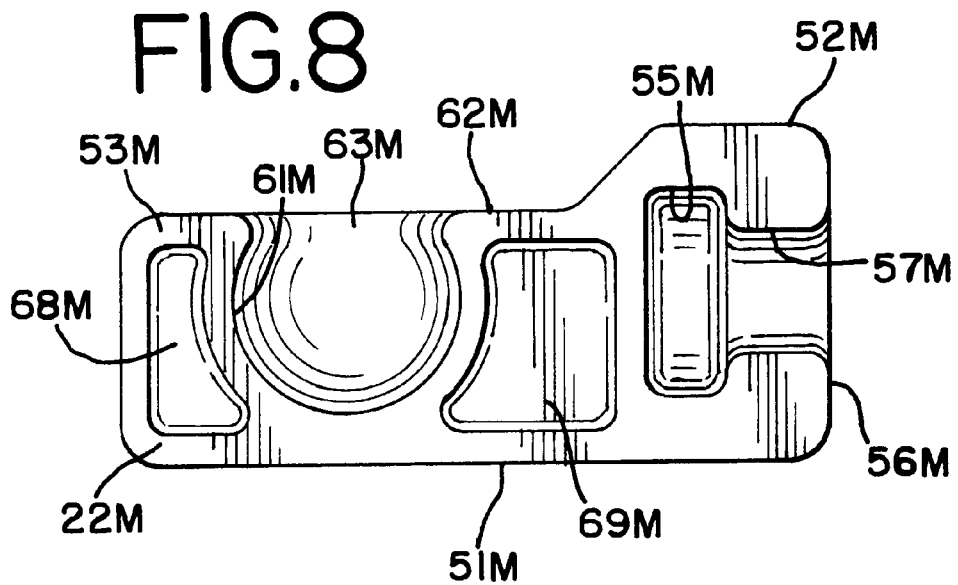

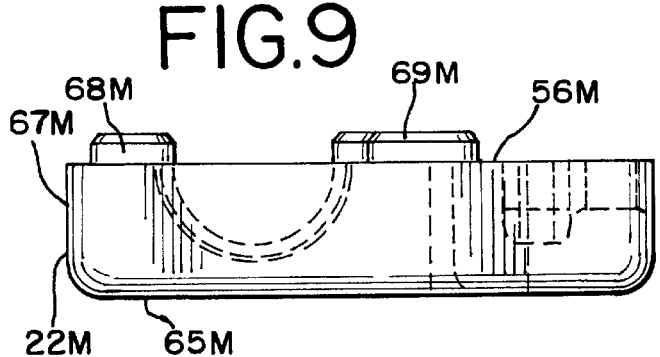
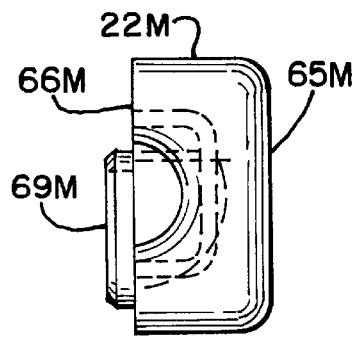
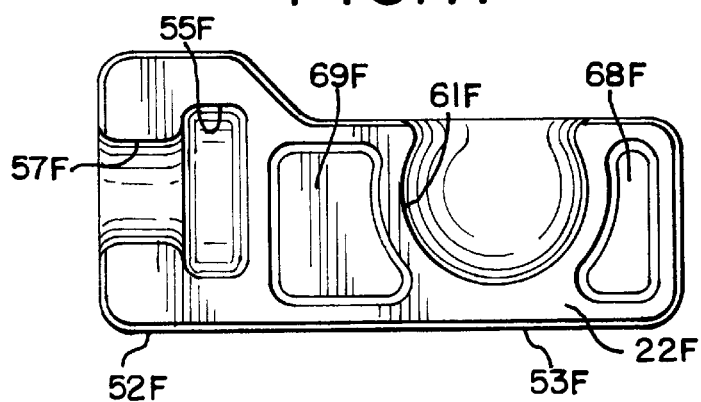
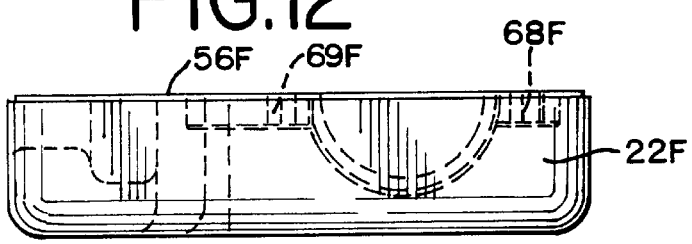
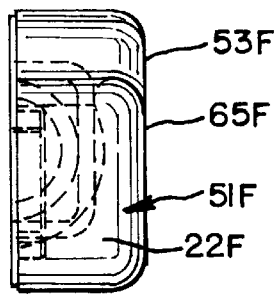
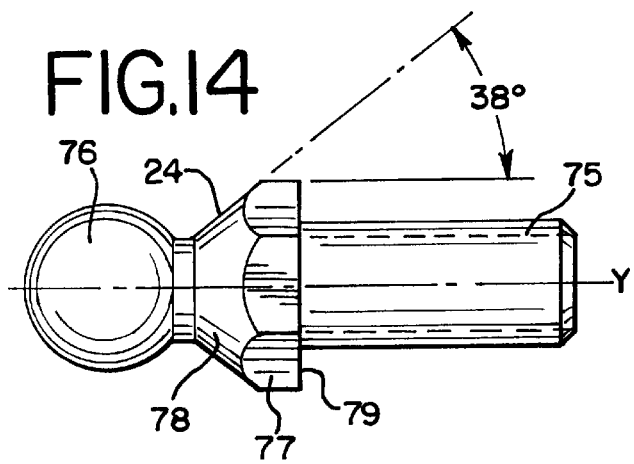

LINK ASSEMBLY

FIELD OF THE INVENTION

This invention relates generally to utility vehicles such as lawn and garden tractors and the like. It relates, more particularly, to the link assembly which normally connects the shifting apparatus to the transaxle in such vehicles.

BACKGROUND OF THE INVENTION

A conventional link assembly for connecting the shifting apparatus to the transaxle in lawn and garden tractors and the like might include a spacer formed of a steel rod, threaded at both ends. Machined steel fittings for seating ball studs are threaded onto each end of the rod and fixed in place with lock nuts. The fittings are machined to form sockets which enclose the ball of a ball stud at each end of the link. The stud at one end of the link is then connected to the shifting apparatus of the vehicle while the stud at the other end is connected to the transaxle.

Another conventional link assembly of this type also utilizes machined steel seats for the ball ends of the ball studs. However, the seats are formed by machining them into opposite ends of a square cross-section solid steel shaft, which serves as the spacer and seats for the ball stud fitting.

Conventional link assemblies of this type require dust boots to prevent foreign material from entering the machined bearing sockets in which the balls seat at each end of the link assembly. In addition, such assemblies conventionally require that lubricant be injected into each socket during assembly to provide necessary lubrication for the ball and socket connection.

The first described conventional link assembly permits variation of the ball stud relationships (between a 90°, 180° and 270°, for example) without changing components. However, its construction is heavy and expensive. The second described conventional link assembly is less expensive, but is more difficult to assemble with ball studs at opposite ends in varying relationships.

SUMMARY OF THE INVENTION

It is an object of the present invention to provide an improved link assembly for connecting control components in a vehicle.

It is another object to provide an improved link assembly for connecting shifting and transaxle components in a utility vehicle such as a lawn or garden tractor or the like.

It is still another object to provide an improved link assembly wherein the same spacer configuration can be employed regardless of whether ball studs at opposite ends of the link are orientated parallel to each other or displaced 90°, 180° or 270° from each other.

A further object is to provide an improved link assembly wherein the length of the spacer can be easily and inexpensively changed.

Yet a further object is to provide an improved link assembly comprising molded plastic link and socket components which permit closer tolerances and better dimensional control to be maintained.

Still a further object is to provide an improved link assembly comprising molded plastic components which can be joined ultrasonically.

Another object is to provide an improved link assembly in which neither a dust boot nor periodic lubrication is required.

The foregoing and other objects are realized in accord with the present invention by providing a link assembly comprising a spacer molded of glass-filled nylon and configured the same regardless of the ball stud relationship desired. Identical socket housings are mounted on each end of the spacer, in predetermined orientations and encapsulating corresponding ball ends of ball and stud components.

Each socket housing comprises a male socket component and a female socket component also molded of glass-filled nylon. The male socket components are identical to each other. The female socket components are mirror-image identical to each other except for complementary male locator protrusions and female locator depressions formed in opposing relationship on mating faces of respective components.

Mating pairs of male and female socket components are assembled over mounting pins unitarily formed on each end of the spacer. The configuration of the mounting pins and complementary recesses in the socket components permit orientation of the socket component at displacement angles of 0°, 90°, 180° or 270° relative to each other (about the spacer axis).

At the same time each of the two mating pairs of male and female socket components capture the ball end of a ball stud. The internal dimensions of the socket are easily controlled in the molding process to insure that a uniformly snug fit is achieved between ball and socket. The stud extends out of the mated socket components at each end of the assembly in an orientation normally perpendicular to the spacer axis. Movement of the stud through a predetermined angle is permitted by the assembly.

The male and female socket components at each end of the assembly are ultrasonically welded together in this relationship. The socket housings thus formed at each end of the assembly are rigidly connected to the spacer in the preselected orientation. The welding process also serves to cause sufficient plastic deformation in the sockets to enhance the uniformity and snugness of the fit between ball and socket.

BRIEF DESCRIPTION OF THE DRAWINGS

The invention, including its construction and operation, is illustrated more or less diagrammatically in the drawings, in which:

FIG. 1 is a perspective view of a portion of the gear shift apparatus and transaxle connection in a garden tractor, wherein the connection incorporates a link assembly embodying features of the present invention;

FIG. 2 is a side elevational view of the link assembly seen in FIG. 1;

FIG. 3 is a top plan view of the link assembly seen in FIG. 1;

FIG. 4 is an end elevational view of the link assembly seen in FIG. 1;

FIG. 5 is an enlarged side elevational view of the link component for the link assembly seen in FIGS. 1–4;

FIG. 6 is an end elevational view of the link component seen in FIG. 5;

FIG. 7 is a sectional view taken along line 7—7 of FIG. 5;

FIG. 8 is a front elevational view of a male socket housing component for the link assembly seen in FIGS. 1–4;

FIG. 9 is a side elevational view of the housing component seen in FIG. 8;

FIG. 10 is an end elevational view of the housing component seen in FIG. 8;

FIG. 11 is a front elevational view of a female socket housing component for the link assembly seen in FIGS. 1–4;

FIG. 12 is a side elevational view of the housing component seen in FIG. 11;

FIG. 13 is an end elevational view of the housing component seen in FIG. 11;

FIG. 14 is a side elevational view of a ball stud component for the link assembly seen in FIGS. 1–4;

DESCRIPTION OF THE PREFERRED EMBODIMENT

Figure 15:
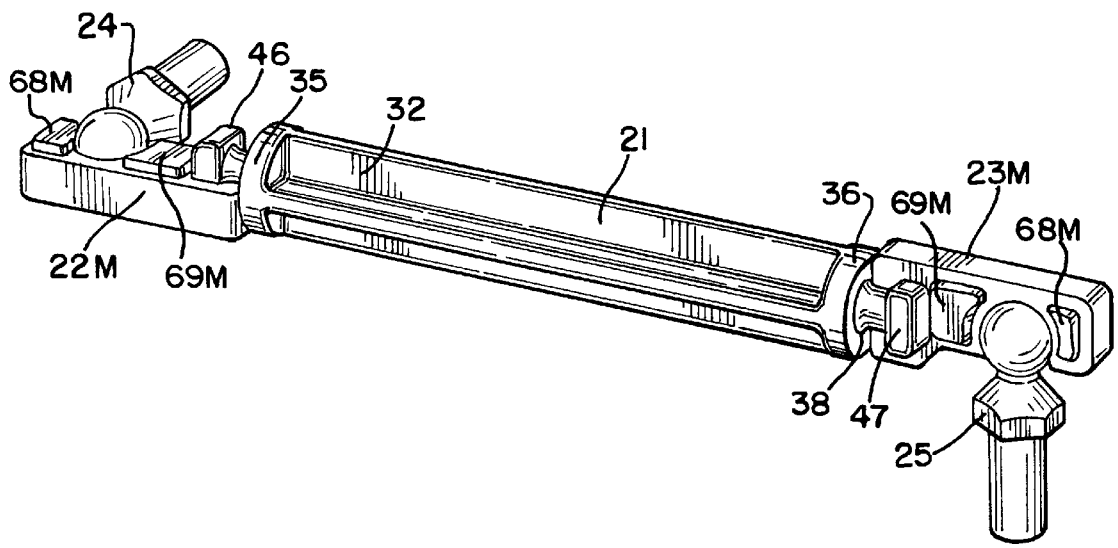
FIG. 15 is a perspective view of the link assembly embodying features of the invention, with the female socket housing components removed for purposes of illustration.

Referring now to the drawings and particularly to FIG. 1, a portion of a garden tractor is illustrated generally at 10. The portion of the tractor 10 shown includes driven rear wheels 11. The rear wheels 11 are belt driven from an internal combustion engine (not shown) through a transaxle 15. The tractor 10 can be operated in forward and reverse gears. Gear shifting is accomplished with a shifting apparatus 16 connected to the transaxle 15 through a link assembly 20 embodying features of the present invention.

Referring now to FIGS. 2–4, the link assembly 20 comprises a center spacer 21 having identical socket housings 22 and 23 mounted on opposite ends. The socket housing 22 has a ball stud 24 seated therein, and the socket housing 23 has a ball stud 25 mounted therein. The ball studs 24 and 25 are identical.

In FIGS. 2–4 the ball stud 24 is orientated 90° from the ball stud 25 about the axis X of the link assembly 20. According to the invention, however, the socket housings 22 and 23 can be mounted on the center spacer 21 in any of four positions so as to change the ball stud orientation from 90° to 180°, 270° or 0° (parallel).

The center spacer 21 and socket housings 22 and 23 are each molded in a conventional manner of Dupont Zytel 70G33 glass filled nylon. The spacer 21 is molded as one component. The socket housing 22 is molded in two mating components, a male socket component 22M and a female socket component 22F. Correspondingly, the socket housing 23 is also molded in two mating components, a male socket component 23M and a female socket component 23F. The socket components 22M and 22F, and the socket components 23M and 23F, are assembled with the spacer 21 and the ball studs 24 and 25 in a manner hereinafter discussed.

Referring now to FIGS. 5–7, the spacer 21 is shown independently. The spacer 21 is molded in one piece and comprises an elongated body 31. The body 31 is defined by four ribs 32 radiating from a central core 33 and a pair of end caps 35 and 36. As seen in FIG. 6, the end cap 36 is circular in end view. The end cap 35 is identical.

Protruding axially outward from the flat end face 37 on end cap 35 is a mounting pin 42 on which the socket housing 22 is subsequently mounted. An identical mounting pin 43 protrudes axially outward from the flat end face 38 on end cap 36. The socket housing 23 is subsequently mounted on the pin 43. The pin 42 has an enlarged head 46 on its free end while the pin 43 has an identical enlarged head 47 on its free end. The enlarged heads 46 and 47 are square in cross-section configuration, as seen in FIG. 6 (head 47).

Referring now to FIGS. 8–10, the male socket component 22M is illustrated separately. The male socket component 22M comprises a one-piece, molded plastic housing 51M. The housing 51M includes a spacer attachment collar 52M and a ball-stud attachment body 53M extending longitudinally away from the collar.

The collar 52M has a well 55M which is rectangular in cross-section formed into it. The well 55M is open to the end face 56M on the collar 52M through a semi-circular depression 57M.

The body 53M has a segmentally spherical socket 61M formed into it. The socket 61M is open to the top face 62M on the body 53M through a semi-circular opening 63M.

The collar 52M and body 53M have a common, flat outer face 65M. They also have a common inner face 66M from which two locator protrusions 68M and 69M extend. Except where the locator protrusions 68M and 69M are found, the common inner face 66M is also flat. A flat end face 67M on the body 53 connects the outer face 65M and inner face 66M.

Referring to FIGS. 11–13, the female socket component 22F is molded in a mirror image of the male component 22M, with the sole exception that depressions 68F and 69F are formed into the face 66F of the housing 51F. The depressions 68F and 69F correspond in both shape and dimension to the protrusions 68M and 69M on the male socket component 22M whereby, when the components 22M and 22F are mated, they register to properly locate the components relative to each other. In all other respects the two components are identical (in mirror image) and corresponding reference numerals with "M" and "F" suffixes identify corresponding structure.

The male and female socket components 23M and 23F correspond precisely to the aforedescribed male and female socket components 22M and 22F. In other words, the male socket components 22M and 23M are identical to each other, and the female socket components 22F and 23F are identical to each other. Accordingly, the male and female socket components 23M and 23F are not separately illustrated in detail.

Turning now to FIG. 14, the ball stud 24 is illustrated. It comprises a threaded stud 75 at one end and a segmentally spherical ball 76 at the other end. Separating the stud 75 and ball 76 is a hexagonal collar 77 which has a frusto-conical face 78 opposing the ball 76 and a flat face 79 opposing the stud 75. For reasons hereinafter discussed, the angle of the frusto-conical face 78 relative to the axis Y of the ball stud 24 is 38°.

FIG. 15 illustrates the manner in which the link assembly 20 seen in FIGS. 2–4 is assembled, according to the invention. As seen there, where the tractor design is such that a (clockwise) displacement of 90° between the ball studs 24 and 25 is required, a pair of male socket components 22M are seated on mounting pins 42 and 43 with the socket components fixed in the illustrated relationship to each other by the enlarged square heads 46 and 47 on the pins. The square heads 46 and 47 seat in the rectangular cross-section wells 55M in the respective male socket components 22M and 23M. Seated in this manner, the flat end faces 67M seat flush against corresponding flat end faces 37 and 38 on the mounting pin end caps 35 and 36, respectively.

With the spacer 21 and male socket components 22M and 23M mated in this manner, the ball 76 on each ball stud 24 and 25 is seated in the segmentally spherical socket 55M of its respective male socket component. The outside diameter (OD) of the ball 76 is nominally 0.346 inches. The inside diameter (ID) of the socket 55M is nominally 0.348 inches. Thus, each ball 76 seats snugly in a corresponding socket 55M but is free enough to permit the stud 75 to move angularly.

At this point, female socket components 22F and 23F are mated with corresponding male components 22M and 23M. Both the square cross-section heads 46, 47 on the ends of the spacer 21 are effectively encapsulated. The ball 76 ends of each ball stud 24 and 25 are captured. The protrusions 68M and 69M on the male socket components 22M and 23M seat snuggly in the corresponding depressions 68F and 69F in the female socket components 22F and 23F.

The mating male and female socket components 22M and 22F are then ultrasonically welded to each other, as are the components 23M and 23F, at the faces 66M and 66F. The link assembly 20 is effectively unitized.

Figure 16:
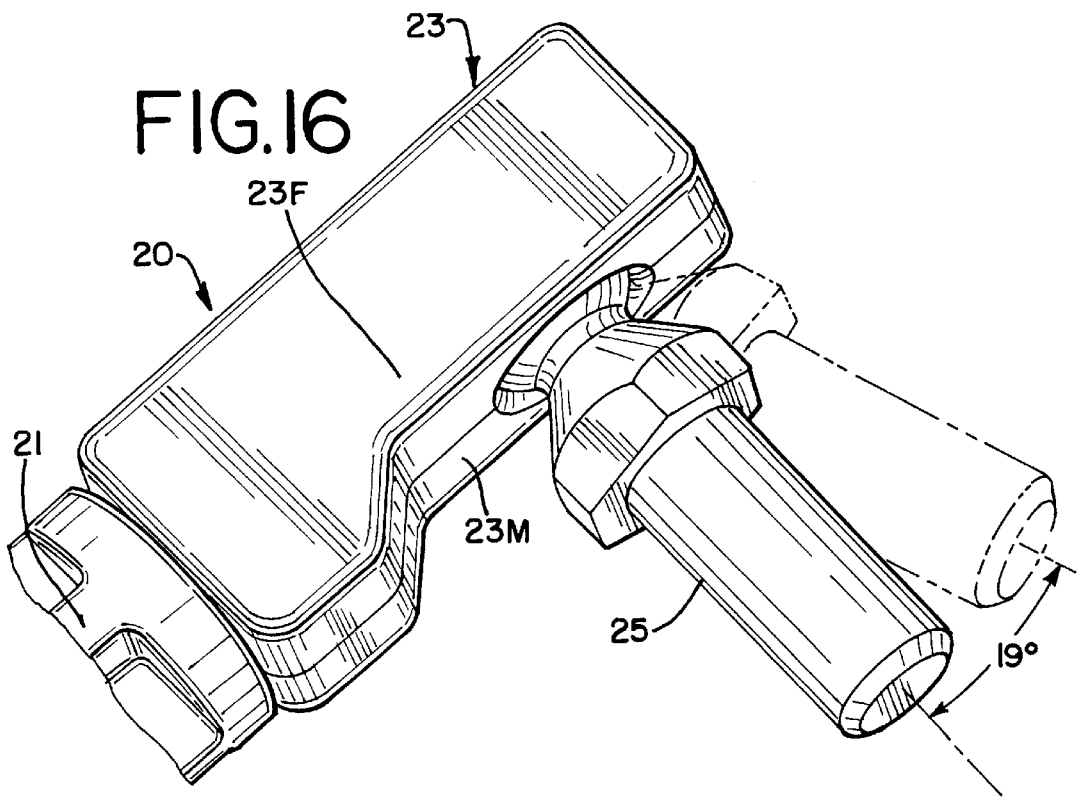
FIG. 16 is an enlarged perspective view of one end of a link assembly, with the ball stud component shown in solid lines perpendicular to the axis of the link and in dotted lines displaced 19° from perpendicular.

Referring now to FIG. 16, one end of the link assembly 20 is shown in an enlarged view. Here, it will be seen that the ball stud is permitted to rotate through an arc of 19° from perpendicular in any direction. The 38° angle of the frusto-conical face 77 on the ball-stud collar 78 acts as a limit stop for this movement.

The link assembly 20 construction which has been described does not require a dust cover. The snugness of the fit between ball and socket achieved by using the molding and ultrasonic welding techniques described actually prevents harmful amounts of dust and dirt from entering the sockets. At the same time, the nylon and steel interface of the ball and socket do not require independent lubrication.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed:

1. A link assembly for a vehicle control system, comprising:
   (a) a plastic spacer molded in one piece;
   (b) said spacer including an elongated body and a mounting element on at least one end said body;
   (c) said mounting element including a mounting pin extending axially from said elongated body and an enlarged head on the end of said pin, said head being polygonal in cross-section;
   (d) a ball socket housing seated on said one mounting element;
   (e) said ball socket housing including a first socket component and a second socket component, said socket components having opposed inner faces;
   (f) said first and second socket components each including a collar adjacent one end and a socket adjacent the other end;
   (g) a well formed in each of said collars, each said wells having a polygonal cross-section;
   (h) said first and second socket components being mated at said opposed inner faces so as to enclose said polygonal cross-section head in said wells.

2. The link assembly of claim 1 further characterized in that:
   (a) each of said wells is rectangular in cross-section; and
   (b) said head has a substantially square cross-section;
   (c) whereby said spacer can be connected to said housing in any of four radial orientations.

3. The link assembly of claim 1 further characterized in that:
   (a) said spacer body comprises a central core and a plurality of ribs radiating therefrom;
   (b) and end cap formed on said one end of said core;
   (c) said mounting element extending from said end cap.

4. The link assembly of claim 1 further characterized in that said spacer and said socket component are molded from glass-filled nylon.

5. A link assembly, comprising:
   (a) a plastic spacer molded in one piece;
   (b) said spacer including an elongated body and a mounting element on each end of said body;
   (c) each of said mounting elements including a mounting pin extending axially from said elongated body and an enlarged head on the end of each pin, each of said heads being substantially square in cross-section;
   (d) a ball socket housing seated on each of said mounting elements;
   (e) each of said ball socket housings including a first socket component and a second socket component, said socket components having opposed inner faces and being molded of plastic;
   (f) each of said first and second socket components in each housing including a collar adjacent one end and a socket adjacent the other end of the component;
   (g) a well formed in each of said collars, each well having a substantially rectangular cross-section;
   (h) said first and second socket components in each housing being mated at said opposed inner faces so as to enclose a corresponding square cross-section head of said spacer in said wells of the corresponding housing.

6. The link assembly of claim 5 further characterized in that:
   (a) said spacer has a centerline which runs longitudinally through the center of each pin;
   (b) said socket components being mated on said centerline.

* * * * *